UNITED STATES PATENT OFFICE.

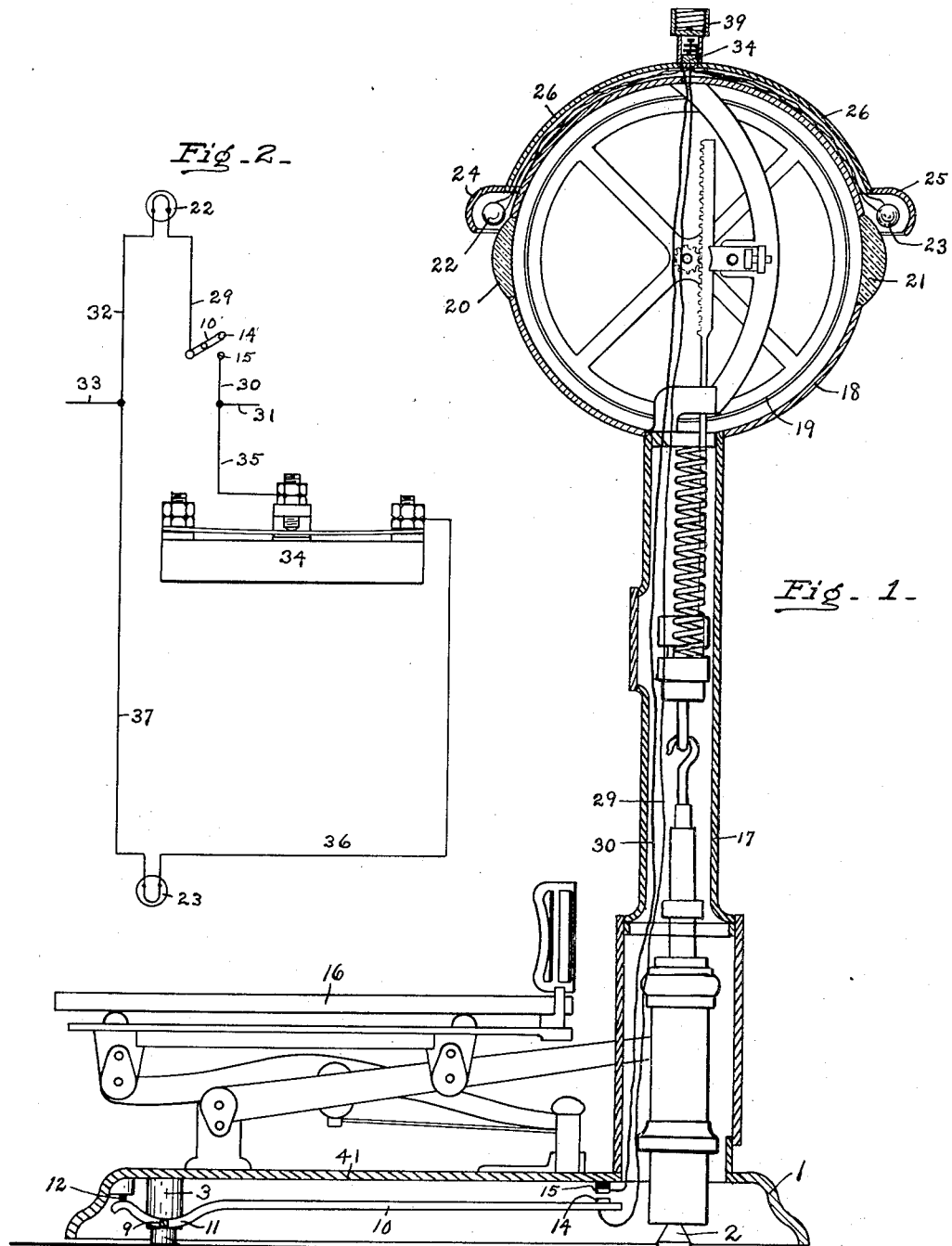

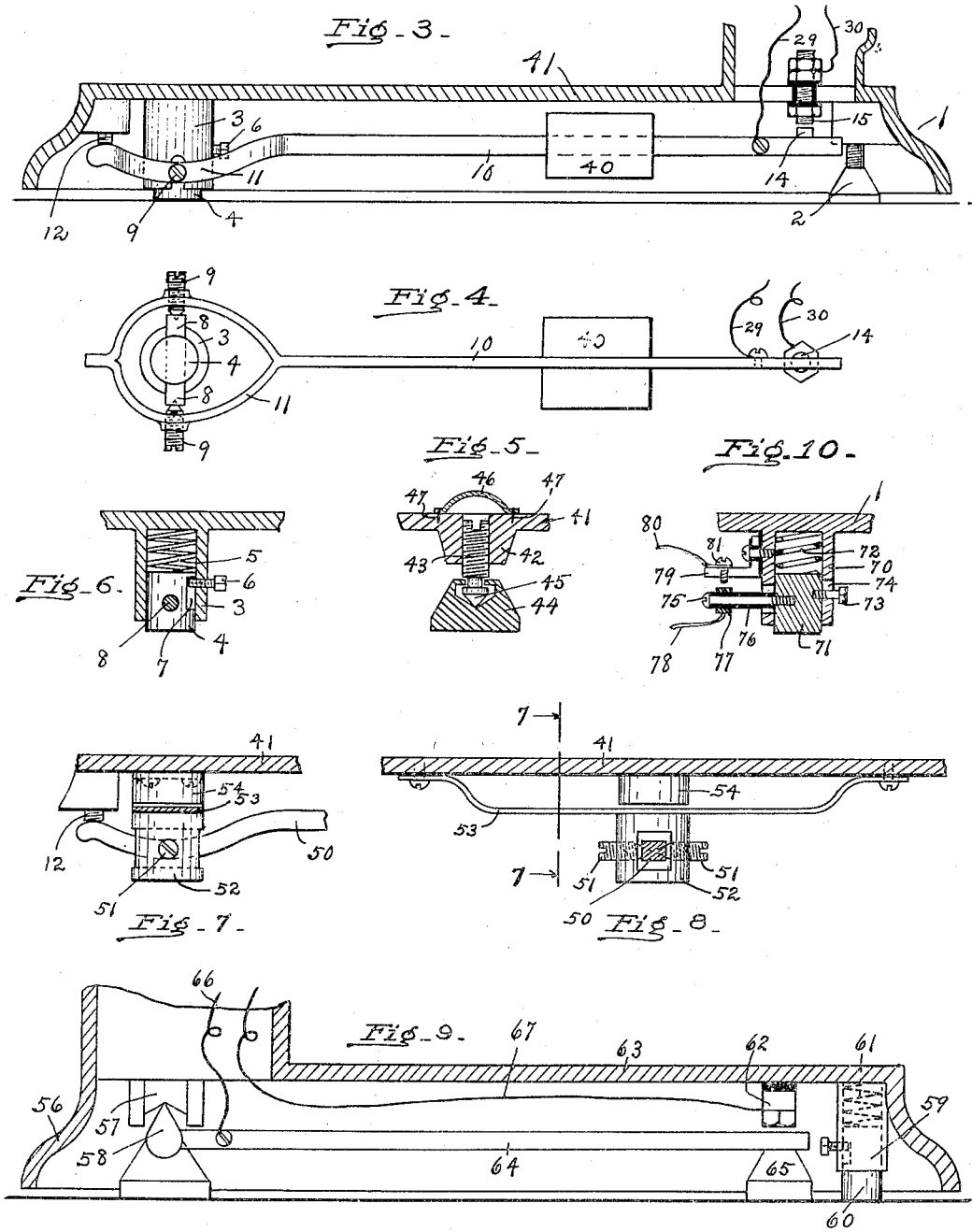

BERT W. KING, OF DETROIT, MICHIGAN, ASSIGNOR TO STANDARD COMPUTING SCALE COMPANY, OF DETROIT, MICHIGAN, A CORPORATION OF MICHIGAN.

SCALE.

1,068,504.      Specification of Letters Patent.      Patented July 29, 1913.

Application filed January 29, 1912. Serial No. 674,084.

*To all whom it may concern:*

Be it known that I, BERT W. KING, a citizen of the United States, and a resident of Detroit, in the county of Wayne and State of Michigan, have invented a new and useful Scale, of which the following is a specification.

This invention relates to means for illuminating the indicating devices of weighing scales, and its object is to provide mechanism for such purpose which shall be simple in construction, which may be attached to any desired type of scale, and which shall have no effect upon the operation of any of the movable parts of the scale.

This invention consists, in combination with the base or main supporting frame of the scale, of an electric lamp, a circuit for the same, and a pair of electric contacts in said circuit which are normally separated, which shall be brought together whenever a weight exceeding a predetermined amount shall be placed on the load-receiving portion of the scale.

It further consists in combination with the main base or frame of the scale, of yielding means for supporting one edge of said base or frame, which means normally hold the electric contacts of a lighting circuit separated, and which means will be overcome by the placing of a predetermined weight upon the load-receiving portion of the scale, and which will then permit the engagement of the electric contacts so as to complete the circuit to an electric lamp, properly positioned with reference to the indicating mechanism of the scale.

In the accompanying drawings Figure 1 is a vertical, transverse section of the base, column and upper cylinder of a computing scale, the levers and parts attached thereto being shown in the elevation. Fig. 2 is a diagram of electric circuits which may be employed in combination with the present invention. Fig. 3 is a view similar to Fig. 1 showing a slight modification of the invention. Fig. 4 is a bottom plan of the lever shown in Figs. 1 and 3. Fig. 5 is a transverse section of a pedestal for the scale platform. Fig. 6 is a transverse section of a pivot of the mechanism shown in Fig. 1. Fig. 7 is a section on the line 7—7 of Fig. 8 of another modified form of this general invention. Fig. 8 is a front elevation of a pivot and supporting spring. Fig. 9 is a view similar to Fig. 3 of still another modification of the platform-supporting and circuit-controlled mechanism. Fig. 10 is a view of still another modification.

Similar reference characters refer to like parts throughout the several views.

While the construction of the scale shown in Fig. 1 is similar to that shown in the former Patent No. 923,530, dated June 1, 1909, and in the Design Patent No. 40,157, dated July 20, 1909, this present invention is not limited in its use to that particular type of scale, but may be used in connection with scales of any desired construction.

It is often desirable to illuminate the indicating mechanism of weighing scales, particularly those of the computing type, during the time that the scale is being used, and it is also generally desirable to extinguish the light when the scale is not in use. It has previously been suggested that such illuminating device be controlled by a switch connected to or operated by mechanism connected directly to the weighing levers, but such construction has not been found entirely satisfactory, for the reason, that some force is required to actuate the switch or other mechanism which controls the electric circuit, and as a result, the scale does not weigh correctly by reason of such mechanism. In the present construction, an electric circuit for an incandescent lamp is illustrated and means are shown for closing and opening this circuit without interfering in any manner with the weighing mechanism of the scale. In all the different modifications, a pair of contacts are shown, which are held separate by a spring or weight, and which are caused to engage whenever the base of the scale is pressed down against the weight or spring which holds these contacts separated.

In Figs. 1 and 6, the scale base 1 is shown supported by pedestals 2 at its rear or column end, while the front end is provided with a socket 3 in which is slidable the foot 4, normally held outward by the spring 5. A screw 6 may engage in a notch 7 in the foot and limit the movement of the foot. This foot carries projections 8, which are formed with tapering bearings to receive the pointed ends of the screws 9, similar to the screws shown in Fig. 4. A lever 10 is expanded to form a ring 11, which carries the screws 9, and its front end presses up against an adjustable screw 12 carried by the base 1. The rear end of this lever 10 carries a contact 14 which is normally spaced from the insulated contact 15 on the base 1. So long as there is no weight on the scale platform 16, the spring 5 will hold the front edge of the base up away from the table upon which the scale is supported, and at the same time the contacts 14 and 15 will be held apart. But as soon as a weight of predetermined amount is placed upon the platform 16, the spring 5 will be compressed enough farther to permit the contacts 14 and 15 to engage. Under normal circumstances, this additional weight need be no more than about one-half of one per cent. of the capacity of the scale.

In Fig. 1 a column 17 is shown extending up from the base 1 and supporting a cylindrical case 18, in which the indicating drum 19 is revoluble, as explained and shown in the former patents above mentioned. This case 18 is supplied with openings which are bridged by lenses 20 and 21, and the electric lights 22 and 23 may be mounted just above these openings and provided with reflectors 24 and 25. A guard 26 may extend down from the top of the cylinder to each reflector and constitute a conduit for the electric wires to the lamps 22 and 23. The circuit wires 29 and 30 connect respectively the contacts 14 and 15, and while the wire 29 connects to the lamp 22, the other wire 30 connects to the line wire 31. A wire 32 connects the lamp 22 and the line wire 33. These circuits are shown diagrammatically in Fig. 2. It will be readily seen that the lamp 23 may also be connected to line wires in similar manner.

In Fig. 2, a construction is illustrated for automatically opening and closing the circuit to the lamp 23, at frequent intervals, so as to cause the lamp 23 to twinkle or flash, for the purpose of attracting attention to that side of the scale, which will usually be toward the customer. A switch 34 is of the usual construction for such purpose, and connects to the line wire 31 by means of the wire 35, and to the lamp 23 by means of a wire 36. The wire 37 connects the lamp 23 to the line wire 33. Any other desired circuits may be employed between the contacts 14 and 15, the line wires 31 and 32 and the lamps 22 and 23, and while either of the lamps may be omitted if desired, it will be readily seen that either may also be duplicated. The particular circuits and method of mounting the electric lamps form no part of this invention, and a good mechanic can devise a number of different circuits and mountings for the lamps. Preferably, an electric socket 39 will be mounted on the top of the case 18, but it will be readily seen that it may be mounted at any other point on the scale, or even omitted entirely.

In place of the spring 5 shown in Fig. 6, a weight 40, shown in Figs. 3 and 4, may be mounted on the arm 10 of the lever, which weight will be sufficiently heavy and properly positioned to hold up the front edge of the base 1 until a load is placed on the platform 16. The other details of construction shown in Figs. 3 and 4 are similar to those shown in Figs. 1 and 6.

In Fig. 5 is shown a pedestal which may be employed to support the rear or column end of the base 1, two, one on each side, being employed. A lug 42 on the lower side of the upper plate 41 of the base is threaded to receive the adjustable screw 43. A foot 44 is formed with a socket to receive the conical point 45 on this screw. A cap 46, provided with small pins 47, closes the upper end of the bore in which the screw is adjustably mounted.

While Fig. 6 shows a coil spring 5, it will be apparent that this invention is not limited to the coil springs and levers shown in Figs. 1 and 6, or the counterweight shown in Figs. 3 and 4. In Figs. 7 and 8 the lever 50 is shown mounted between the conical points of the screws 51, which are carried by the foot 52. This foot is mounted on a flat spring 53 secured to the bottom of the upper plate 41 of the base. An adjustable screw 12 is in engagement with the front or short arm of this lever 50. A boss 54 is shown projecting down from the plate 41 for the purpose of engaging the foot 52 and spring 53, and thus limit the downward movement of the base. The levers 50 and 10 can be made light and resilient so that after the contact 14 on their outer ends engages the contact 15 on the base, the lever will yield until the boss 54 rests on the foot 52, or until the sleeve 3 engages the table upon which the scale rests.

In Fig. 9 the rear end of the base 56 is shown provided with a saddle 57 which rests on the pivot 58. The front end of the base is provided with a sleeve 59 in which a foot 60 is slidable, but is normally held outward by means of the spring 61. The contact 62 is mounted on the plate 63 of the base and insulated therefrom. An arm 64 may be employed to properly position the support 65 with reference to the saddle 57. When the base is forced downward against the tension of the spring 61 by reason of a load being placed upon the platform, the contact 62 will engage the front end of the arm 64 and the front end of the base will then be carried by the support 65. As the circuit wire 66 connects to the arm 64, and the other circuit wire 67 connects to the contact 62, an engagement between the arm 64 and the contact 62 will close the circuit to the electric lamp in the same manner as before described.

In Fig. 10 is shown a device which may be employed to close the electric circuit above referred to. In this case, the base 1 is formed with a socket 70 in which is slidable the foot 71, being held out by means of the spring 72. A screw 73 is connected to the foot 71 and is movable in the slot 74 and limits the movement of the foot in the sleeve. A screw 75 supports an insulating sleeve 76, upon which is mounted a contact ring 77 to which a circuit wire 78 is connected. A small bracket 79 is connected to but insulated from the sleeve 70. A line wire 80 connects to this bracket and the contact screw 81, which will engage the ring 77 and close the circuit whenever the load on the base 1 sufficiently compresses the spring 72.

Many other modifications may be designed to accomplish the purpose first set forth in this specification. In all the modifications shown in the drawings and above described, resilient means have been provided to yieldably support one portion of the scale base in such a manner as to hold apart two contacts of an electric circuit, which means are so constructed that the resistance will be overcome by a predetermined additional load on the scale. As a result, whenever a predetermined load is placed upon the platform of the scale, or whatever other load-receiving device may be employed, an additional pressure is transmitted to the base and by it to the contact-controlling devices. As the load on the platform remains in place during the weighing operation, the electric circuits to the illuminating devices will be kept closed so long as the scale is in use, and will be opened immediately when the weighing is completed. As the base will assume its proper position immediately when anything is placed upon the load-receiver, the operation of the scale will not be affected in any manner by the addition of the improved circuit-closing device above illustrated and described.

I claim—

1. In an illuminating device for the indicating mechanism of a weighing scale, the combination of rigid and yieldable supports for the base of the scale on opposite sides of the center of gravity of the scale, an electric lamp mounted adjacent the indicating mechanism of the scale, electric circuits connecting said lamp and a current source, a lever mounted on a stationary pivot and having one end in engagement with the base of the scale adjacent the movable support for the scale, and a circuit closing device connected to the opposite end of the lever and rendered operative when the scale is depressed by a load.

2. In an illuminating device for the indicating mechanism of a weighing scale, the combination of an electric lamp mounted adjacent the weight indicator, means to yieldably support one portion of the base of the scale comprising a sleeve connected to said base, a foot slidable in said sleeve and a spring in said sleeve to normally hold the foot outward, a lever mounted intermediate its ends on said foot and having one end engaging said base, an electric contact mounted on the opposite end of said lever, a second contact mounted on the base, and electric circuits between said contacts and said lamp over which a current may flow to said lamp whenever the base engaging end of the lever is depressed sufficiently by a load to cause the contacts to engage.

3. In an illuminating device for the indicating mechanism of a weighing scale, the combination of an electric lamp mounted adjacent the weight indicator of the scale, means to yieldably support one portion of the base of the scale comprising a sleeve mounted on the base, a foot slidable in said sleeve, a lever mounted intermediate its ends on said foot and having one end engaging said base, means for resisting the weight of the base, an electric contact mounted on the free end of the lever, a second contact mounted on the base, and electric circuits between said contacts and said lamp whereby a current is conducted to said lamp whenever the base is depressed sufficiently by a load to cause the contacts to engage.

4. In an illuminating device for the indicating mechanism of a weighing scale, the combination of a sleeve mounted on the base, a foot slidable therein, a lever mounted intermediate its ends on said foot and having one end engaging said base, an electric contact mounted on the free end of the lever, a second contact mounted on the base, means to resist the downward pressure of said base, electric wires connecting to said contacts, which contacts will engage when additional weight is added to that of the base, and an electric lamp connecting to said wires and a current source and mounted adjacent the weight indicator.

5. In an illuminating device for the indicating mechanism of a weighing scale, the combination of a sleeve mounted on the base of the scale, a foot slidable therein, a pair of electric contacts, and a spring engaging said foot to resist the downward pressure of the base and prevent the contacts engaging until additional weight is placed upon the base, an electric lamp mounted adjacent the weight indicator of the scale, and electric connections between the contacts, the lamp, and a current source.

6. In an illuminating device for the indicating mechanism of a weighing scale, the combination of yieldable and unyieldable supports for the scale, a pair of electric contacts normally held apart by the yieldable supporting device, an electric lamp mounted adjacent the weight indicator of the scale, and electric circuits between the contacts and the lamp whereby a current is conducted to energize the lamp whenever the yieldable supporting device of said base permits the contacts to engage.

7. In an illuminating device for the indicating mechanism of a weighing scale, the combination of a spring beneath the base of the scale adapted to be partially compressed by the base when no load is on the scale, a pair of contacts normally held separated by said spring, an electric lamp to illuminate the scale, and electric circuits connecting to said contacts and lamp over which a current will flow during the time a load on the scale is of sufficient weight to give enough added compression to said spring to cause it to permit the contacts to engage.

In testimony whereof I have signed this specification in the presence of two subscribing witnesses.

BERT W. KING.

Witnesses:
J. M. BUCHER,
L. JAENICHEN.